US 7,650,534 B2

(12) United States Patent
Stuchly et al.

(10) Patent No.: US 7,650,534 B2
(45) Date of Patent: Jan. 19, 2010

(54) APPARATUS, METHOD AND COMPUTER PROGRAM FOR CORRECTION OF MULTIPLE BIT ERRORS

(75) Inventors: Ulf Stuchly, Jönköping (SE); Björn Habberstad, Bankeryd (SE)

(73) Assignee: SAAB AB, Linköping (SE)

( * ) Notice: Subject to any disclaimer, the term of this patent is extended or adjusted under 35 U.S.C. 154(b) by 380 days.

(21) Appl. No.: 11/427,792

(22) Filed: Jun. 30, 2006

(65) Prior Publication Data
US 2007/0033479 A1    Feb. 8, 2007

(30) Foreign Application Priority Data
Jul. 12, 2005    (EP) ................... 05106350

(51) Int. Cl.
*G06F 11/00* (2006.01)
(52) U.S. Cl. .......................................... 714/6
(58) Field of Classification Search ............ None
See application file for complete search history.

(56) References Cited
U.S. PATENT DOCUMENTS
5,784,548 A * 7/1998 Liong et al. ................ 714/6

2004/0230767 A1* 11/2004 Bland et al. ................ 711/203

OTHER PUBLICATIONS

Nithin H. Vaidya: "Comparison of Duplex and Triplex Memory Reliability", IEEE Transactions on Computers, vol. 45, No. 4, Apr. 1996.
Patent Abstracts of Japan, vol. 1998, No. 03, Feb. 27, 1998 & JP 09 288619 A (Mitsubishi Electric Corp), Nov. 4, 1997.

* cited by examiner

*Primary Examiner*—Michael C Maskulinski
(74) *Attorney, Agent, or Firm*—Venable LLP; Eric J. Franklin

(57) ABSTRACT

The present invention relates to an apparatus and method for monitoring and correcting data errors in a computer system, in particular transient data errors in computer systems having very limited tolerance for deteriorations in performance. The method comprises the steps of: writing a set of data to a plurality of separate databases (50, 80), the databases including at least a first database (50) and a second database (80), reading the set of data from the first database and applying an error correction code (ECC) to detect possible multiple bit errors in the set of data which was read from the first database, and in case an error is detected, the error is reported to an error management unit (30). Furthermore, the error management unit manages a switch of means from which data are read from the first database to the second database, and applying the error correction code for correcting single bit errors in the previously read set of data. The writing means corrects data in the first database by writing the set of data from the second database to both of the first and second databases, and reports to the error management unit that the error is corrected.

9 Claims, 2 Drawing Sheets

APPARATUS, METHOD AND COMPUTER PROGRAM FOR CORRECTION OF MULTIPLE BIT ERRORS

TECHNICAL FIELD OF THE INVENTION

The present invention generally relates to an apparatus, method and computer program for monitoring and correcting data errors in a computer system. In particular, the invention relates to correction of transient data errors in computer systems having very limited tolerance for deteriorations in performance, such as in the field of avionics.

BACKGROUND OF THE INVENTION

In modern computer technology, there is a need for monitoring and correcting transient errors in data by means of error correcting code, in particular when writing and reading to and from a memory or other register, such as a database or other storage arrangement. The error correcting code used often follows any previously known or well-recognized algorithm, which may already be part of common general knowledge to skilled persons in the technical field.

An example of such a recognized error correction algorithm is the so-called Reed-Solomon algorithm. This particular error correction algorithm is a coding scheme which operates by first constructing a polynomial from data symbols to be transmitted and then sending an over-sampled plot of the polynomial instead of the original symbols themselves. As a consequence of redundant information contained in the over-sampled data, it is possible to reconstruct the original polynomial and thus the data symbols, even in the face of transmission errors, at least up to a certain degree of error. However, there are several other recognized algorithms that could be suitable for use, and the Reed-Solomon algorithm is just one of these. Other examples include the Hamming code, the Reed-Muller code, the Binary Golay code, convolutional code, various turbo codes and others.

The number of corrections necessary in a set of data is dependent on the error intensity which is accepted or acceptable by the system in which the error correction is applied. An example of this is that fault tolerance must be extremely limited in an aviation system, but other applications, such as telephony or data transmission and also the automotive industry to certain extent, requires low cost solutions. As a trade-off between price and performance in those areas of applicability, certain amounts of inaccuracy may be accepted as long as a low or possibly a medium price level can be maintained in a system.

All error correcting systems introduce certain delays between the transmitter and receiver. In general, an error correction system also deteriorates the over-all performance in any data or communication system. The most spread error correcting code corrects single bit errors and detects multiple bit errors. In information theory and coding, an error correction code, ECC, is defined as a code in which each data signal conforms to specific rules of construction so that departures from this construction in the received signal generally can be detected and corrected automatically. It is used in computer data storage, for example in dynamic RAM, and in data transmission. The simplest error correcting codes are able to correct single-bit errors (single error correction or SEC) and to detect double-bit errors (double error detection or DED). Other codes can detect or correct multiple bit errors.

In the scientific article, "Duplex and Triplex Memory: Which Is More Reliable?", by Nitin H. Vaidya, department of Computer Science, Texas A&M University, Technical Report 94-025, February 1994, is disclosed an academic study including how replication improves system performance at the cost of increased redundancy. In the article, the reliability of a system using duplication of memory modules is shown to be always worse than simple triplication if the ECC used in the duplex system is capable of only error detection or only single error detection. However, if the ECC is capable of single error detection as well as double error correction, then the duplex system can achieve higher reliability than the triplex system.

In addition to the above, Shannon's theorem is an important theory in error correction which describes the maximum attainable efficiency of an error correction scheme versus the levels of expected interference resulting from noise. If the number of errors is less than or equal to the maximum correctable threshold of the code, all errors will be corrected.

Hence, it can be concluded that all presently known and available error correction codes require more signal elements than are necessary to convey the basic information.

SUMMARY OF THE INVENTION

It is therefore an object of the present invention to alleviate the previously mentioned disadvantages with undesired performance deterioration as a result of necessary error correction. This object is accomplished by an apparatus, method and related computer program for monitoring and correcting data errors in a computer system, in particular transient data errors in computer systems having very limited tolerance for deteriorations in performance, the method comprising the steps of:

writing a set of data to a plurality of separate databases, the data-bases including at least a first database and a second database, reading the set of data from the first database, applying an error correction code to detect possible multiple bit errors in the set of data which was read from the first database, and in case an error is detected, the error is reported to an error management unit, the error management unit managing a switch of means from which data are read from the first database to the second database, and applying the error correction code for correcting single bit errors in the previously read set of data, correcting data in the first database by writing the set of data from the second database to both of the first and second databases, and reporting to the error management unit that the error is corrected.

The advantages of the above described invention are many. A particular advantage applies when the fault-tolerance is low, possibly in relation to transient errors in the data communication between transmitter and receiver having databases or other memory means, and is due to the fact that it must not anymore be chosen between either of:

Correcting more bits of data by means of an error correction algorithm, such as the mentioned Reed-Solomon algorithm. The previous problems associated with deterioration of performance for each transmitter or receiver access, and their included storage means, such as any non-volatile memory, are thus alleviated. Especially the main memory location in a computer assembly must be dimensioned with respect to performance taking such utilisation into consideration.

Use of multiple databases of memories making use of so-called voting, which is a result-based comparison leading to a choice. Here, double databases makes detection of errors possible but not correction, while triple or more makes it possible to base the choice on a majority. The associated problem relating to such a solution would be the deteriorated over-all system performance for every transmitter or receiver access (compare the above-mentioned dimensioning for achieving desired performance). Moreover, yet at least another storage means or memory is required for correction when utilizing the so-called voting capability.

A system solution with parallel data sets utilizing voting on a system level. For correction is required to carry out two to three sequential executions which in turn leads to at least a limitation of system performance to the unacceptable level of no more than half or even less than half of its original system performance.

BRIEF DESCRIPTION OF THE DRAWINGS

The features, objects, and further advantages of this invention will become apparent by reading this description in conjunction with the accompanying drawings, in which like reference numerals refer to like elements and in which.

DETAILED DESCRIPTION

The following description is of the best mode presently contemplated for practicing the invention. The description is not intended to be taken in a limiting sense, but is made merely for the purpose of describing the general principles of the invention. The scope of the invention should only be ascertained with reference to the issued claims.

Figure 1:
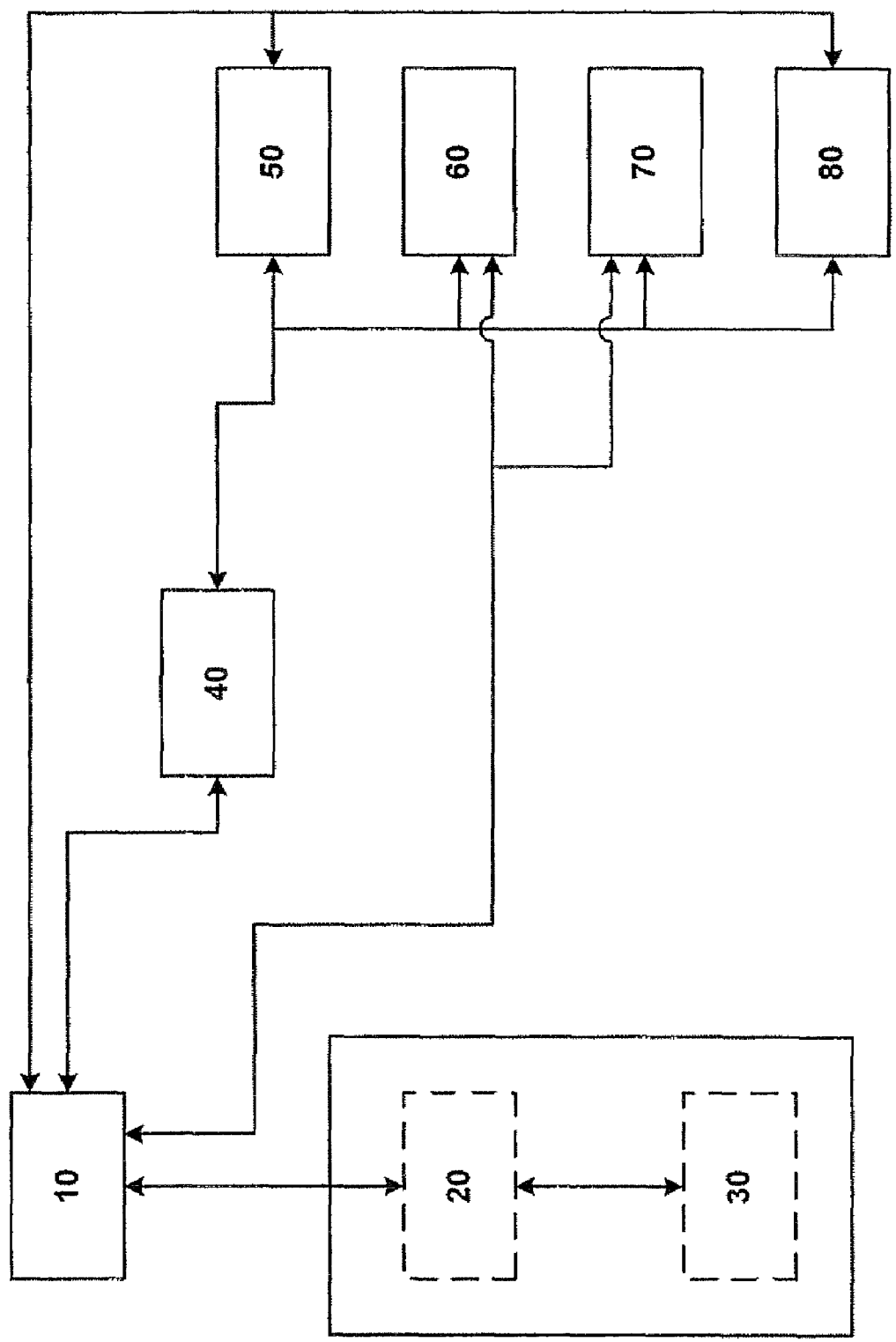
FIG. 1 illustrates an apparatus for monitoring and correcting data errors in a computer system in accordance with the present invention.

With reference to FIG. 1, a system is disclosed which is to be used for monitoring and correcting data errors in memory means or other storage means in a general purpose computer, or system of interconnected computers in a network. Error correction code logic 10 is connected to a first database 50 and a second database 80, over which transmission information of any suitable data format is to be transmitted. An overall management system including an access controller 20 and an error management unit 30 is coupled to the error correction code logic 10, which in turn is connected to error correction code result units 60 and 70 respectively, each unit being associated with each of the respective databases 50 and 80. Error correction code data is transmitted over the connection between the error correction code logic 10 and the error correction code result units 60 and 70.

Referring to the mentioned figure, error correction code logic 10 is also connected to a duplex database logic 40, which bi-directionally forwards or receives address and command information to and from the first database 50 and the second database 80, as well as their respective and associated error correction code result units 60 and 70.

Figure 2:
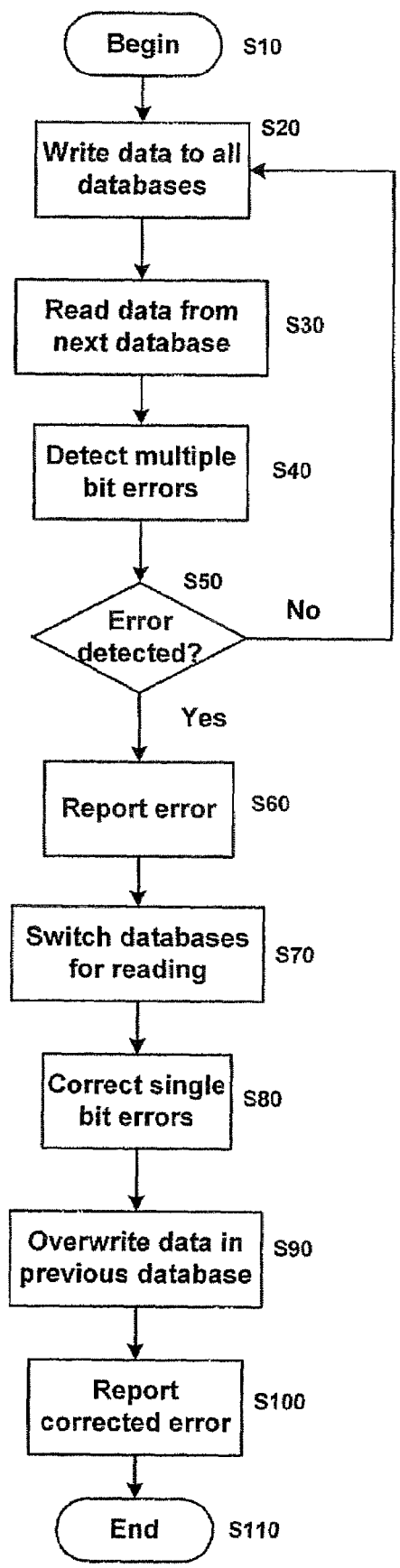
FIG. 2 is a flowchart depicting the sequential routine carried out in accordance with the present invention.

With particular reference to FIG. 2, a flowchart depicts the sequential routine carried out in accordance with the present invention. The routine begins (S10) with the step of writing (S20) a set of data to all of the comprised databases, which in the present embodiment consist of only two databases, the first and the second database. The sequence continues in that data are read (S30) from the first database followed by application of an error correction code (ECC) to detect (S40) possible multiple bit errors in the set of data which was read from the first database. In case an error is detected (S50), the error is reported (S60) to the error management unit 30. Otherwise, i.e. in case no error can be found, the routine continues with writing and reading data as before.

However, provided an error is detected, the detection leads to further consequences consisting of the error management unit managing a switch (S70) of means from which data are read. The switch is made from the first database to the second database, and the switch is followed by application of the error correction code for correcting (S80) single bit errors in the previously read set of data. The correction of data in the first database is accomplished by overwriting (S90), which means an update of the set of data retrieved from the second database in both of the first and second databases.

The routine has a final step of reporting (S100) to the error management unit that the error is corrected, and after having reported this, the routine reaches its final and ends (S110).

The approach and embodiments according to the present invention here described have many advantages over related art and related technology. The inventive combination of the methods multiple bit detection and correction leads to the novel and inventive possibility of correcting a significantly larger amount of bits without deterioration of system performance, which is a crucial parameter in all commercial computer systems, and in particular within the technical field of avionics and to certain extent also relating to crucial functions in automotive technology.

The present invention maintains performance substantially on a previously set level of error correction code during all accesses and causes a performance loss first when a multiple bit error is detected and then corrected. This has the result that already existing commercial off-the-shelf (or COTS) components can be used. The term COTS is meant herein to refer to systems which are manufactured commercially and which may be tailored for specific uses. This is often used for military purposes, in computers and in robotic systems. COTS systems are quite the contrary to systems that are produced entirely and uniquely for the specific application. The major advantage of COTS products is of course the significantly lower costs as compared to products produced solely for one single and often highly specific application.

Use of COTS components with a minimum of external logic also makes is possible to avoid unnecessary and comparatively costly ASIC construction. By ASIC is here meant an application-specific integrated circuit, which is an integrated circuit (IC) customized for a particular use, rather than intended for general-purpose use. For example, a chip designed solely to run a cell phone would belong to the ASIC group of components. In contrast to that, a microprocessor is not, because users can adapt it to many purposes. Using a purely commercial criterion, it could be said that the intellectual property, design database, application, distribution and sales are owned and controlled by individuals or a commercial enterprise, and that individual or enterprise or company is almost always a separate entity to the device manufacturer. Often that individual or company is the end user or OEM (original equipment manufacturer) and the device is not available commercially.

The above-described method for monitoring and correcting data errors may be carried out by a computer program. The computer program may be recorded on a computer readable medium. The computer program can cause an apparatus described above to carry out the above-described method.

However, in a further embodiment, it is conceivable or possible that the product could be commercialized and protected by producing a specific ASIC component having the features of the present invention. This specific component would consist of a combination of so-called standard products, which is marketed and sold by the device manufacturer and as such a combination being commercially available as highly specific and proprietary as having been developed by the applicant.

The foregoing description of the embodiments of the invention has been presented for purposes of illustration and description. It is not intended to be exhaustive or to limit the invention to the precise forms disclosed, since many modifications or variations thereof are possible in light of the above teaching. Accordingly, it is to be understood that such modifications and variations are believed to fall within the scope of the invention. It is therefore the intention that the following claims not be given a restrictive interpretation but should be viewed to encompass variations and modifications that are derived from the inventive subject-matter disclosed.

The invention claimed is:

1. A method of monitoring and correcting data errors in a computer system, the method comprising:
   writing a set of data to a plurality of separate databases, the databases including at least a first database and a second database,
   reading the set of data from the first database,
   applying an error correction code to detect multiple bit errors in the set of data which was read from the first database, and in case a multiple bit error is detected, reporting the multiple bit error to an error management unit,
   managing with the error management unit a switch of reading data from the first database to the second database, and applying the error correction code for correcting single bit errors in the previously read set of data,
   correcting data in the first database by writing the set of data from the second database to both of the first and second databases, and
   reporting to the error management unit that the error is corrected.

2. The method according to claim 1, wherein the databases comprise storage devices.

3. The method according to claim 1, wherein the databases or memories are physically separated.

4. The method according to claim 1, wherein the databases are each grouped with a respective error correction code unit.

5. The method according to claim 1, wherein the error correction code comprises a Reed-Solomon algorithm.

6. An apparatus for monitoring and correcting data errors in a computer system, the apparatus comprising:
   a detector configured to receive data read from a plurality of separate databases including at least a first database and a second database, the detector being further configured to apply an error correction code to detect multiple bit errors in the set of data which was read from the first database, and in case a multiple bit error is detected, report the error to an error management unit,
   error management unit for managing a switch of from where data are read from the first database to the second database, and for applying the error correction code for correcting single bit errors in the previously read set of data.

7. The apparatus according to claim 6, further comprising:
   a computer program product comprising a computer readable medium and computer program instructions recorded on the computer readable medium and executable by a processor for causing the apparatus to monitor and correct data errors by carrying out a method comprising
   writing a set of data to the plurality of separate databases,
   reading the set of data from the first database,
   applying the error correction code to detect multiple bit errors in the set of data which was read from the first database, and in case the multiple bit error is detected, reporting the multiple bit error to the error management unit,
   switching from where data are read from the first database to the second database, and applying the error correction code for correcting single bit errors in the previously read set of data,
   correcting data in the first database by writing the set of data from the second database to both of the first and second databases, and
   reporting to the error management unit that the error is corrected.

8. A computer program product, comprising:
   a computer readable medium, and
   computer program instructions recorded on said computer readable medium and executable by a processor for carrying out a method of monitoring and correcting data errors in a computer system, the method comprising
   writing a set of data to a plurality of separate databases, the databases including at least a first database and a second database,
   reading the set of data from the first database,
   applying an error correction code to detect multiple bit errors in the set of data which was read from the first database, and in case a multiple bit error is detected, the multiple bit error is reported to an error management unit,
   the error management unit managing a switch of from where data are read from the first database to the second database, and applying the error correction code for correcting single bit errors in the previously read set of data,
   correcting data in the first database by writing the set of data from the second database to both of the first and second databases, and
   reporting to the error management unit that the error is corrected.

9. The method according to claim 2, wherein the storage devices comprise non-volatile memories.

* * * * *

UNITED STATES PATENT AND TRADEMARK OFFICE
CERTIFICATE OF CORRECTION

| | | |
|---|---|---|
| PATENT NO. | : 7,650,534 B2 | Page 1 of 1 |
| APPLICATION NO. | : 11/427792 | |
| DATED | : January 19, 2010 | |
| INVENTOR(S) | : Stuchly et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Twenty-third Day of November, 2010

David J. Kappos
*Director of the United States Patent and Trademark Office*